(12) United States Patent
Malakapalli et al.

(10) Patent No.: US 8,941,670 B2
(45) Date of Patent: Jan. 27, 2015

(54) PARA-VIRTUALIZED HIGH-PERFORMANCE COMPUTING AND GDI ACCELERATION

(75) Inventors: Meher Prasad Malakapalli, Santa Clara, CA (US); Hao Zhang, Sunnyvale, CA (US); Lin Tan, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 13/352,121

(22) Filed: Jan. 17, 2012

(65) Prior Publication Data

US 2013/0181998 A1 Jul. 18, 2013

(51) Int. Cl.
*G06F 15/16* (2006.01)
*G06T 1/20* (2006.01)

(52) U.S. Cl.
USPC .......................... 345/503; 345/502; 345/506

(58) Field of Classification Search
CPC ...... G06T 1/20; G06T 15/005; G06T 2210/52
USPC ......................................................... 345/503
See application file for complete search history.

(56) References Cited

U.S. PATENT DOCUMENTS

| 7,619,630 | B2 | 11/2009 | Peeper et al. | |
|---|---|---|---|---|
| 8,661,355 | B1 * | 2/2014 | Liu et al. | 715/759 |
| 2005/0231503 | A1 | 10/2005 | Heng et al. | |
| 2006/0146057 | A1 | 7/2006 | Blythe | |
| 2006/0161572 | A1 | 7/2006 | Vogt et al. | |
| 2008/0074430 | A1 | 3/2008 | Jiao et al. | |
| 2008/0168479 | A1 | 7/2008 | Purtell et al. | |
| 2008/0204473 | A1 * | 8/2008 | Jackson | 345/620 |
| 2008/0303833 | A1 | 12/2008 | Swift et al. | |
| 2009/0322764 | A1 | 12/2009 | Saini et al. | |
| 2010/0214301 | A1 | 8/2010 | Li et al. | |
| 2010/0328334 | A1 | 12/2010 | Chen et al. | |
| 2011/0063296 | A1 | 3/2011 | Bolz et al. | |
| 2011/0080404 | A1 * | 4/2011 | Rhoades et al. | 345/423 |
| 2011/0102443 | A1 * | 5/2011 | Dror et al. | 345/522 |

(Continued)

OTHER PUBLICATIONS

Dowty, et al., "GPU Virtualization on VMware's Hosted I/O Architecture", In Proceedings of the First conference on I/O virtualization, 2008, pp. 1-8.

(Continued)

*Primary Examiner* — David Zarka
*Assistant Examiner* — Tapas Mazumder
(74) *Attorney, Agent, or Firm* — Jim Sfekas; Peter Taylor; Micky Minhas (57) ABSTRACT

The present invention extends to methods, systems, and computer program products for para-virtualized GPGPU computation and GDI acceleration. Some embodiments provide a compute shader to a guest application within a para-virtualized environment. A vGPU in a child partition presents compute shader DDIs for performing GPGPU computations to a guest application. A render component in a root partition receives compute shader commands from the vGPU and schedules the commands for execution at the physical GPU. Other embodiments provide GPU-accelerated GDI rendering capabilities to a guest application within a para-virtualized environment. A vGPU in a child partition provides an API for receiving GDI commands, and sends GDI commands and data to a render component in a root partition. The render component schedules the GDI commands on a 3D rendering device. The 3D rendering device executes the GDI commands at the physical GPU using a sharable GDI surface.

12 Claims, 5 Drawing Sheets

(56) References Cited

U.S. PATENT DOCUMENTS

2011/0179261 A1* 7/2011 Tachibana .................... 713/2
2011/0242119 A1 10/2011 Bolz et al.
2013/0155080 A1* 6/2013 Nordlund et al. ............. 345/522

OTHER PUBLICATIONS

"SUSE Linux Enterprise Virtual Machine Driver Pack", Retrieved on: Nov. 11, 2011, Available at: http://www.suse.com/products/vmdriverpack/features/performance.html.
Gupta, et al., "GViM: GPU-accelerated Virtual Machines", In Proceedings of the 3rd ACM Workshop on System-level Virtualization for High Performance Computing, Mar. 31, 2009, pp. 8.
Direct3D Functions Called by User-Mode Display Drivers, Retrieved on Jan. 17, 2012, Available at: http://msdn.microsoft.com/en-us/library/ff552862(v=VS.85).aspx.
D3DKMDT_GDISURFACETYPE enumeration, Retrieved on Jan. 17, 2012, Available at: http://msdn.microsoft.com/en-us/library/ff546039(v=vs.85).aspx.
D3D11DDI_DEVICEFUNCS structure, Retrieved on Jan. 17, 2012, Available at: http://msdn.microsoft.com/en-us/library/ff542141(v=vs.85).aspx.
DxgkDdiRenderKm routine, Retrieved on Jan. 17, 2012, Available at: http://msdn.microsoft.com/en-us/library/ff559800(v=vs.85).aspx.
Domonkos, et al., "A Programming Model for GPU-based Parallel Computing with Scalability and Abstraction", In Proceedings of Spring Conference on Computer Graphics, 2009, pp. 103-111.
Buck, et al., "Brook for GPUs: Stream Computing on Graphics Hardware", In Proceedings of ACM Transactions on Graphics, vol. 23, Issue 3, Aug. 2004, pp. 777-786.
Rumpf, et al., "Graphics Processor Units: New Prospects for Parallel Computing", In Proceedings of Numerical Solution of Partial Differential Equations on Parallel Computers, Lecture Notes in Computational Science and Engineering, vol. 51, 2005, pp. 89-134.
Nickolls, et al., "Graphics and Computing GPUs", Published on: Sep. 8, 2010, Available at: http://sjlee.sch.ac.kr/lecture/arch/2010/%B0%AD%C0%C7%BA%B8%C1%B6%C0%DA%B7%E1(4e)/Chapters Appendix/Appendix/Appendix A P374493.pdf.
Difference between effects 10 and effects 11, Retrieved on: Nov. 11, 2011, Available at: http://msdn.microsoft.com/en-us/library/windows/desktop/ff476141(v=vs.85).aspx.
U.S. Appl. No. 13/350,246, filed Mar. 20, 2014, Office Action.
Notice of Allowance dated Sep. 17, 2014 cited in U.S. Appl. No. 13/350,246.

* cited by examiner

PARA-VIRTUALIZED HIGH-PERFORMANCE COMPUTING AND GDI ACCELERATION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some computer systems are configured to provide para-virtualized execution environments, which allow guest software to share hardware devices of a single computer system in an isolated manner. Generally, para-virtualized execution environments provide a plurality of partitions, supported by a hypervisor. The partitions provide isolation between different guest software. The partitions generally include a root partition and one or more child partitions. The root partition runs a host operating system and manages a virtualization stack. The root partition may gain access to physical devices. Each child partition hosts guest software (e.g., guest operating systems and guest applications). Child partitions are provided access to physical devices through virtual devices and software interfaces of the hypervisor.

Some para-virtualized execution environments provide child partitions (and guest software executing therein) with para-virtualized access to one or more physical graphics processing units ("GPUs"). Generally, each implementation of para-virtualized access to physical GPUs supports particular three-dimensional rendering framework(s). As such, guest software may be unable to access capabilities of a physical GPU if that guest software is executing within a para-virtualized execution environment that does not support those capabilities. In some cases, the guest software may rely on using a virtualized CPU to perform tasks not supported para-virtualized access to a physical GPU, incurring a potentially significant performance penalty.

BRIEF SUMMARY

The present invention extends to methods, systems, and computer program products for providing high-performance computing and graphics device interface ("GDI") acceleration in a para-virtualized environment.

Some embodiments include a method for providing graphics processing unit ("GPU") accelerated computing functionality to a guest application executing in a child partition of a para-virtualized execution environment. A virtual machine session is instantiated. A hypervisor in the virtual machine session provides (i) a root partition (which has access to a physical GPU), and (ii) the child partition (which executes the guest application).

A virtualized graphics processing unit ("vGPU") executing within the child partition is presented to the guest application. A user-mode driver ("UMD") of the vGPU presents compute shader device driver interfaces ("DDIs") to the guest application. The compute shader DDIs provide an application programming interface ("API") that enables the guest application to send compute shader commands to the vGPU. The compute shader commands are used to perform general-purpose graphics processing unit ("GPGPU") computations at the physical GPU using a compute shader. A render component executing within the root partition receives a physical GPU-specific compute shader command from the vGPU, and schedules the command for execution at the physical GPU.

Additional embodiments include a method for providing GPU-accelerated GDI functionality to a guest application executing in a child partition of a para-virtualized execution environment. A virtual machine session is instantiated. A hypervisor in the virtual machine session provides (i) a root partition having access to a physical GPU, and (ii) the child partition which executes the guest application.

A vGPU, which executes within the child partition, is presented to the guest application. An API of a kernel-mode driver ("KMD") of the vGPU enables the guest operating system to accelerate GDI rendering commands submitted by a guest application. These commands are then processed by the KMD of the vGPU.

A render component executing within the root partition receives a GDI acceleration rendering command from the vGPU. In response, the render component schedules the GDI acceleration rendering command on a GDI composition device within the root partition. The GDI composition device is configured to execute the GDI acceleration rendering command at the physical GPU. The GDI composition device marks a GDI surface corresponding for the GDI command as sharable for composition by the desktop.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for providing high-performance computing and graphics device interface ("GDI") acceleration in a para-virtualized environment.

Some embodiments include a method for providing graphics processing unit ("GPU") accelerated computing functionality to a guest application executing in a child partition of a para-virtualized execution environment. A virtual machine session is instantiated. A hypervisor in the virtual machine session provides (i) a root partition (which has access to a physical GPU), and (ii) the child partition (which executes the guest application).

A virtualized graphics processing unit ("vGPU") executing within the child partition is presented to the guest application. A user-mode driver ("UMD") of the vGPU presents compute shader device driver interfaces ("DDIs") to the guest application. The compute shader DDIs provide an application programming interface ("API") that enables the guest application to send compute shader commands to the vGPU. The compute shader commands are used to perform general-purpose graphics processing unit ("GPGPU") computations at the physical GPU using a compute shader. A render component executing within the root partition receives a physical GPU-specific compute shader command from the vGPU, and schedules the command for execution at the physical GPU.

Additional embodiments include a method for providing GPU-accelerated GDI functionality to a guest application executing in a child partition of a para-virtualized execution environment. A virtual machine session is instantiated. A hypervisor in the virtual machine session provides (i) a root partition having access to a physical GPU, and (ii) the child partition which executes the guest application.

A vGPU, which executes within the child partition, is presented to the guest application. An API of a kernel-mode driver ("KMD") of the vGPU enables the guest operating system to accelerate GDI rendering commands submitted by a guest application. These commands are then processed by the KMD of the vGPU.

A render component executing within the root partition receives a GDI acceleration rendering command from the vGPU. In response, the render component schedules the GDI acceleration rendering command on a GDI composition device within the root partition. The GDI composition device is configured to execute the GDI acceleration rendering command at the physical GPU. The GDI composition device marks a GDI surface corresponding for the GDI command as sharable for composition by the desktop.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Para-Virtualized Compute Shader (GPGPU) Functionality

Figure 1A:
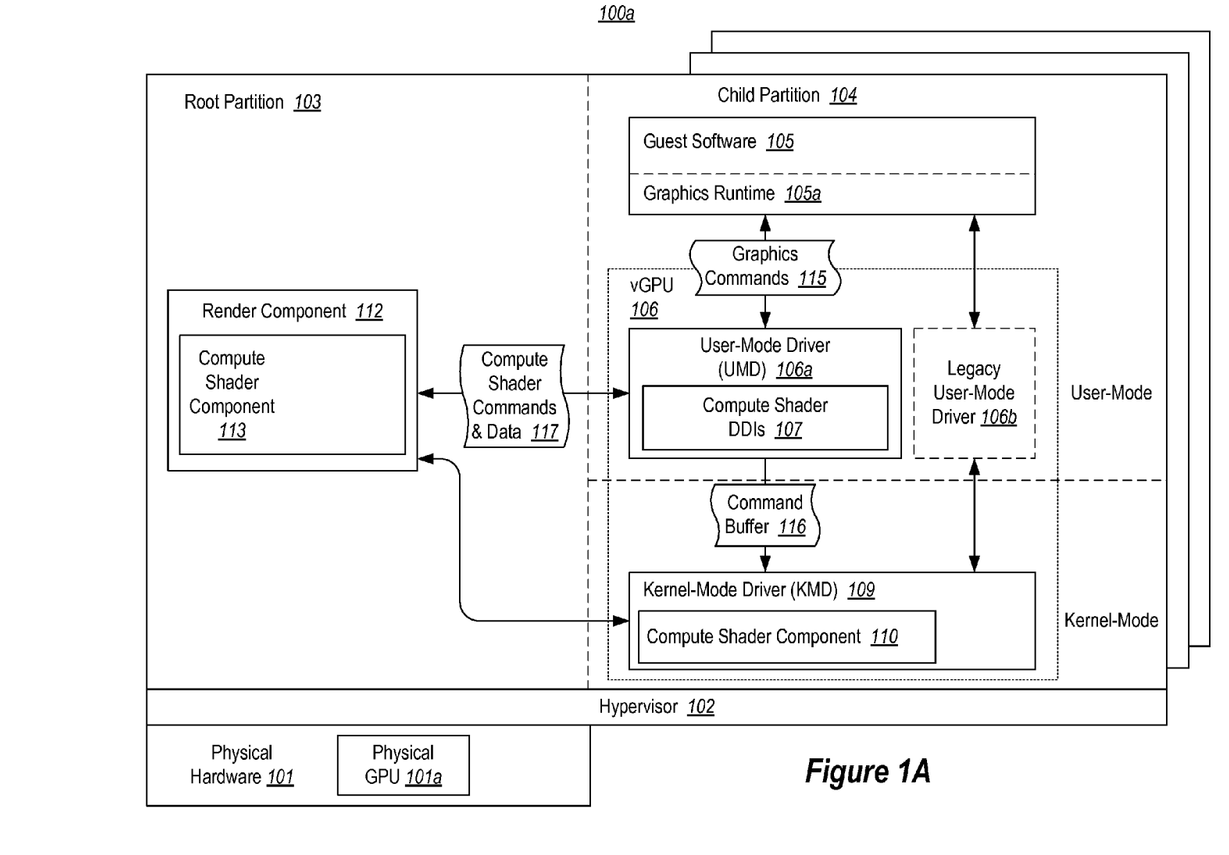
FIG. 1A illustrates an example computer architecture that enables para-virtualized access to compute shader functionality of physical graphics processing unit ("GPU") hardware.

FIG. 1A illustrates an example computer architecture 100a that enables para-virtualized access to compute shader functionality of physical GPU hardware. Referring to FIG. 1A, computer architecture 100a includes physical hardware 101. Physical hardware 101 can include any appropriate hardware devices, such as one or more general purpose processors, system memory, and the like. As depicted, physical hardware includes at least one physical GPU 101a.

Physical GPU 101a is a processing device configured to perform parallel processing tasks, such as graphics rendering. Physical GPU 101a includes support for executing a compute shader, which enables physical GPU 101a to perform general-purpose (i.e., non-graphics rendering) calculations. In other words, physical GPU 101a supports GPGPU computation on a compute shader device.

Computer architecture 100a also includes hypervisor 102. Hypervisor 102 executes on top of physical hardware 101 and supports a virtualization platform. The virtualization platform provides a plurality of partitions. Each partition provides a logical unit of isolation, in which guest software can be executed. For example, computer architecture 100a includes root partition 103 and child partition 104.

Root partition 103 executes a host operating system, and has direct access to physical hardware 101 (as depicted by root partition 103 appearing over physical hardware 101). Each child partition provides an execution environment for executing guest software (e.g., operating systems and/or applications) and may access physical hardware 101 indirectly in a para-virtualized manner. That is, through hypervisor 102, each child partition provides one or more software interfaces (e.g., virtualized hardware) to guest software. The guest software, in turn, uses the software interface(s) to access physical hardware 101. Hypervisor 102 can provide support for a plurality of child partitions.

As depicted, guest software 105 executes within child partition 104. Guest software 105 comprises any appropriate guest software, such as an operating system and/or an application program executing within an operating system. Guest software 105 includes or uses graphics runtime 105a. Graphics runtime 105a provides a framework (e.g., APIs) for rendering graphics and/or performing GPGPU computation.

Child partition 104 provides guest software 105 access to vGPU 106. vGPU 105 virtualizes physical GPU 101a, enabling guest software 105 to indirectly access physical GPU 101a. As such, vGPU 106 is configured to expose all, or a subset, of the functionality of at least one rendering framework (corresponding to graphics runtime 105a) to guest software 105, along with any corresponding functionality of physical GPU 101a.

In particular, vGPU 106 is configured to expose one or more software interfaces that enable guest software 105 to call vGPU 106 to access compute shader functionality of physical GPU 101a for performing GPGPU computation at physical GPU 101a. vGPU 106, in turn, works in conjunction with a render component in root partition 103 to perform compute shader functionality on physical GPU 101a. As depicted, for example, root partition 103 includes render component 112. Render component 112, in turn, includes compute shader component 113 for handing compute shader commands and data. vGPU 106 remotes compute shader commands and data 117 to render component 112 to perform the rendering on physical GPU 101a.

Render component 112 schedules any graphics commands received from vGPU 106 for execution on physical GPU 101a. Render component 112 also creates proper context for executing those commands. As such, render component 112 is configured to use compute shader component 113 to schedule execution of compute shader-related commands that are received from vGPU 106 in child partition 104 on physical GPU 101a.

As depicted, vGPU 106 includes user-mode driver 106a executing in a user-mode of child partition 104 and kernel-mode driver 109 executing in a kernel-mode of child partition 104. User-mode driver 106a exposes device driver interfaces ("DDIs") of at least one rendering framework, including DDIs related to compute shader (GPGPU) functionality, depicted as compute shader DDIs 107. Compute shader DDIs 107 enable guest software 105 to make calls to vGPU 106 for performance of GPGPU computations.

In some embodiments, user-mode driver 106b exposes DDIs of a rendering framework that supports compute shader functionality (e.g., DirectX® versions 10 and/or 11 from Microsoft® Corporation). For example, in embodiments when user-mode driver 106a exposes compute shader functionality of DirectX® versions 10 and 11, user-mode driver 106a may expose the one or more of the following DDIs as part of compute shader DDIs 107:

| | |
|---|---|
| PFND3D11DDI_SETSHADER_WITH_IFACES | pfnCsSetShaderWithIfaces |
| PFND3D10DDI_SETSHADER | pfnCsSetShader |
| PFND3D10DDI_SETSHADERRESOURCES | pfnCsSetShaderResources |
| PFND3D10DDI_SETSAMPLERS | pfnCsSetSamplers |
| PFND3D10DDI_SETCONSTANTBUFFERS | pfnCsSetConstantBuffers |
| PFND3D11DDI_SETUNORDEREDACCESSVIEWS | pfnCsSetUnorderedAccessViews |

In some embodiments, user-mode driver 106b presents all DDIs of a rendering framework that supports compute shader functionality (e.g., DirectX® version 11), such as DDIs related to one or more of a domain shader, a hull shader, or a geometry shader. However, user-mode driver 106b may expose any set of DDIs from any rendering framework supporting compute shader functionality.

In some embodiments, vGPU 106 may also include legacy user-mode driver 106b executing in user-mode of child partition 104. Legacy user-mode driver 106b may expose DDIs of a legacy version of one or more rendering frameworks. For example, legacy user-mode driver 106b may support a legacy version of DirectX® (e.g., DirectX® version 9), or a legacy version any other rendering framework (e.g., OpenGL® from Silicon Graphics, Inc.).

Generally, user-mode driver 106a is configured to construct hardware contexts and command buffers. In particular, user-mode driver 106a converts graphic commands issued by guest software 105 (or graphics runtime 105a of guest software 105) into hardware-specific commands. For example, user-mode driver 106a may receive graphics commands 115 relating to GPGPU computations using a compute shader from guest software 105. User-mode driver 106a is configured to convert graphics commands 115 into hardware-specific commands (i.e., commands that are specific to physical GPU 101a). As part of the conversion, user-mode driver 106a maintains proper hardware context for physical GPU 101a. For example, user-mode driver 106a translates logical values for settings affecting a graphics pipeline into values and corresponding physical settings. User-mode driver 106a is also configured to store converted hardware-specific commands in command buffer 116 and send command buffer 115 to kernel-mode driver 109.

In addition, vGPU 106 includes kernel-mode driver 109 executing in kernel-mode of child partition 104, which includes compute shader component 110. Kernel-mode driver 109 is configured to receive command buffers (e.g., command buffer 116) and to construct corresponding direct memory access ("DMA") buffers. When it is time for a DMA buffer to be processed, a GPU scheduler calls kernel-mode driver 109. Kernel-mode driver 109 then handles the specifics of actually submitting the DMA buffer to physical GPU 101a.

Figure 2A:
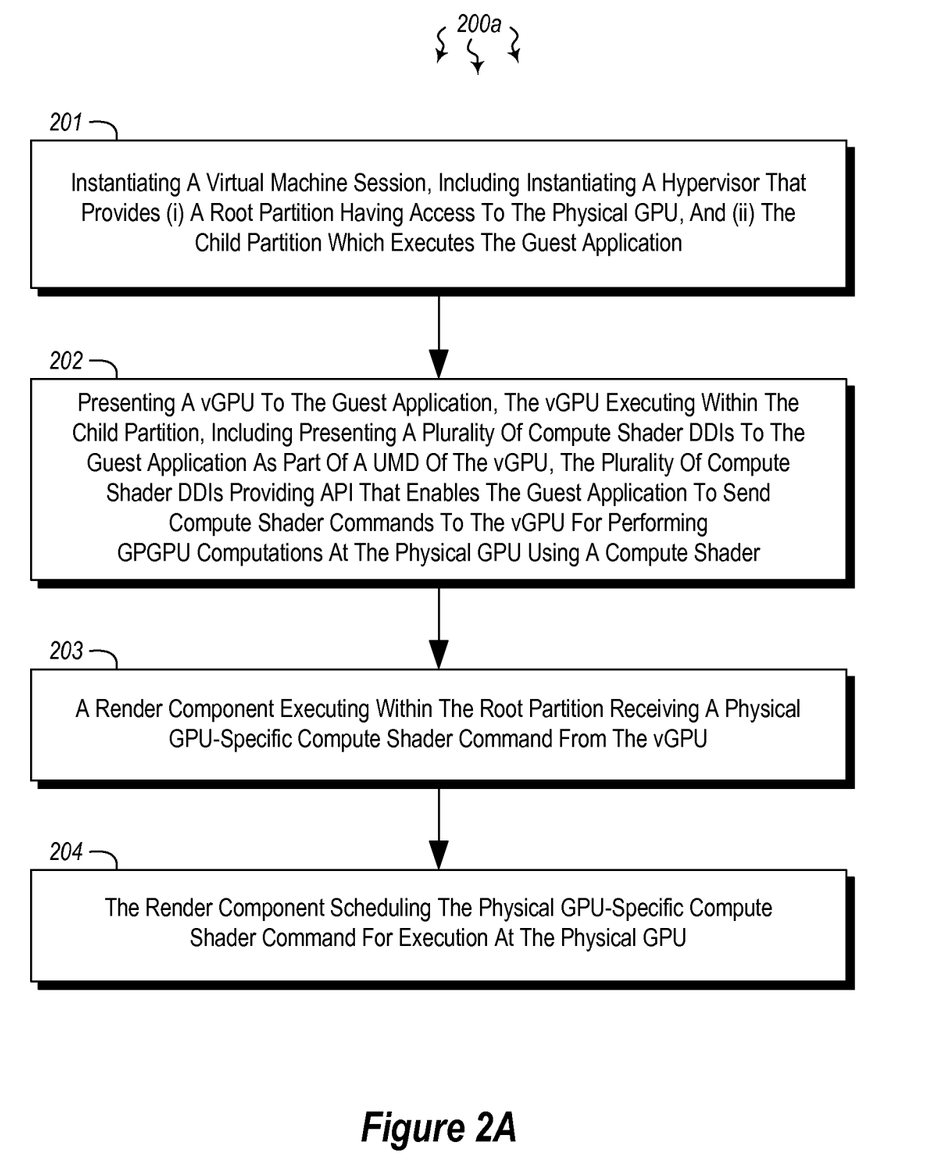
FIG. 2A illustrates a flow chart of an example method for providing GPU-accelerated computing functionality to a guest application executing in a child partition of a para-virtualized execution environment.

FIG. 2A illustrates a flow chart of an example method 200a for providing GPU-accelerated computing functionality to a guest application executing in a child partition of a para-virtualized execution environment. Method 200a will be described with respect to the components and data of computer architecture 100a.

Method 200a includes an act of instantiating a virtual machine session, including instantiating a hypervisor that provides (i) a root partition having access to the physical GPU, and (ii) the child partition which executes the guest application (act 201). For example, computing environment 100a can instantiate hypervisor 102 as part of instantiating a virtual machine session. Hypervisor 102 provides root partition 103 and child partition 104. Root partition 103 has access to physical GPU 101a. Child partition 104 executes one or more guest applications, including guest application 105, and has indirect access to physical GPU 101a.

Method 200a also includes an act of presenting a vGPU to the guest application, the vGPU executing within the child partition, including presenting a plurality of compute shader DDIs to the guest application as part of a UMD of the vGPU, the plurality of compute shader DDIs providing an API that enables the guest application to send compute shader commands to the vGPU for performing GPGPU computations at the physical GPU using a compute shader (act 202). For example, child partition 104 can present vGPU 106 to guest software 105. vGPU 106 includes user-mode driver 106a. User-mode driver 106a presents compute shader DDIs 107, which enable guest software 105 to call vGPU 106 to perform compute shader GPGPU calculations at physical GPU 101a. For example, guest software 105 (or graphics runtime 105a) can send graphics commands 115 to vGPU 106 for performance of GPGPU calculations at physical GPU 101a.

User-mode driver 106a converts received graphics commands 115 to physical-hardware specific commands (e.g., as part of command buffer 116). vGPU 106 then remotes compute shader commands and data 117 (including physical-hardware specific commands) to render component 112.

Method 200a also includes an act of a render component executing within the root partition receiving a physical GPU-specific compute shader command from the vGPU (act 203). For example, render component 112, which executes in root partition 103, can receive compute shader commands and data 117, including a physical GPU-specific compute shader command, from vGPU 106.

Method 200a also includes an act of the render component scheduling the physical GPU-specific compute shader command for execution at the physical GPU (act 204). For example, compute shader component 113 can schedule the received physical GPU-specific compute shader command for execution on a compute shader device at physical GPU 101a. In doing so, compute shader component 113 can configure and maintain appropriate context for execution of the physical GPU-specific compute shader command.

Para-Virtualized GDI Acceleration

Figure 1B:
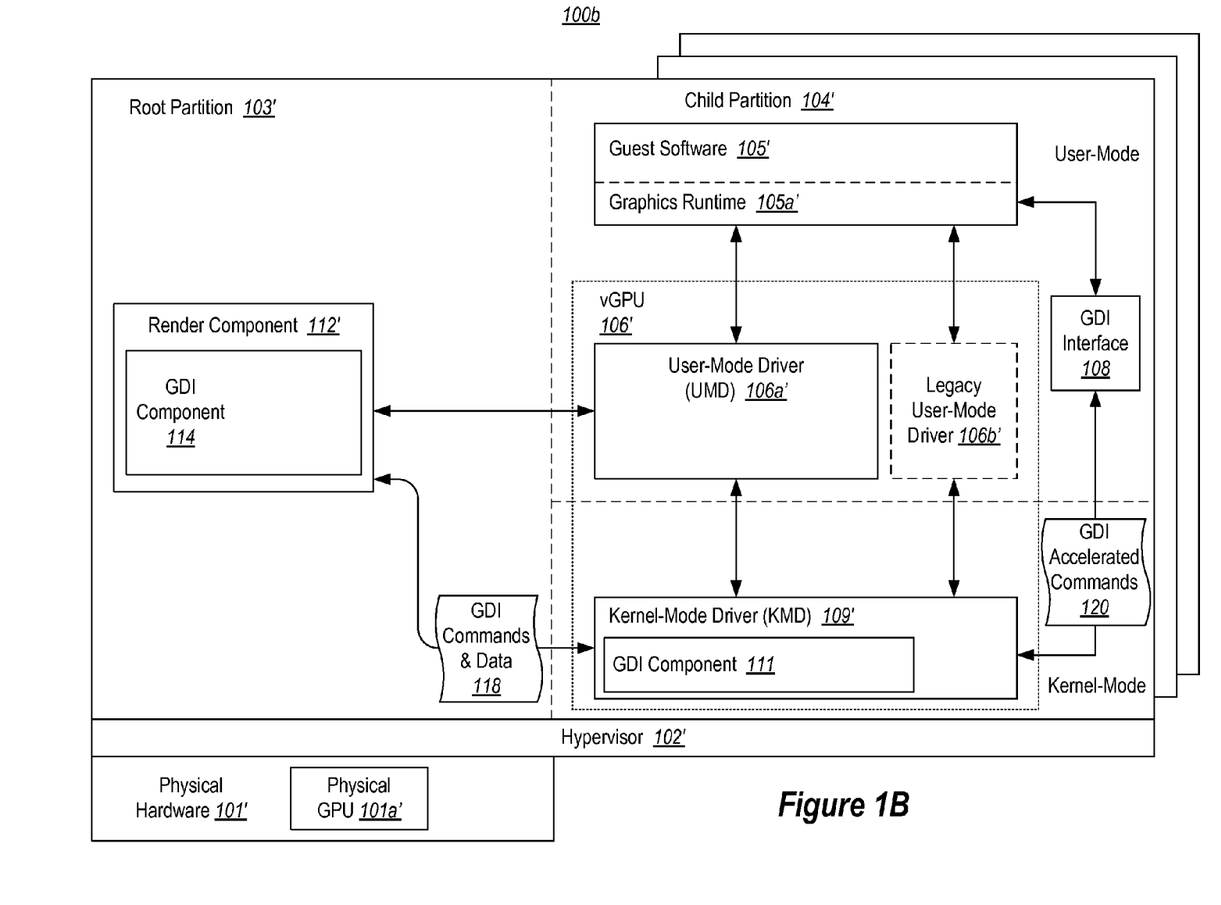
FIG. 1B illustrates an example computer architecture that enables para-virtualized graphics device interface ("GDI") acceleration by physical GPU hardware.

In addition to providing guest software para-virtualized compute shader access to physical GPU 101a (i.e., GPGPU computational ability), embodiments extend to providing guest software para-virtualized GDI acceleration at a physical GPU. FIG. 1B illustrates an alternate computer architecture 100b that enables para-virtualized GDI acceleration by physical GPU hardware. Thus, computer architecture 100b enables guest software to request GDI command acceleration using a physical GPU, as opposed to handling GDI commands with a physical or virtual central processing unit.

Within child partition 104', computer architecture 100b provides components that enable accelerated rendering of GDI commands on physical GPU 101a' when those commands are issued by guest software 105'. As depicted, for example, child partition 104' includes GDI interface 108, which is configured to communicate with graphics runtime 105a' (e.g., a graphics runtime that is part of a guest operating system). Furthermore, vGPU 106' is configured to process GDI acceleration commands 120 received from GDI interface 108 at GDI component 111 of kernel-mode driver 109'.

GDI interface 108 is configured to expose one or more GDI command interfaces to graphics runtime 105a', and to forward GDI accelerated commands received from graphics runtime 105a' to kernel-mode driver 109' of vGPU'. Thus, at the request of guest software 105', graphics runtime 105a' is enabled to send GDI accelerated graphics commands 120 to kernel-mode driver 109' of vGPU 106' via GDI interface 108 to accelerate GDI command execution at physical GPU 101a'.

GDI component 111 of kernel-mode driver 109' is configured to implement one or more GDI command interfaces, along with corresponding hardware rendering operation(s). In some embodiments, vGPU 106' implements and exposes GDI commands corresponding to a particular version of DirectX® (e.g., DirectX® versions 10 and/or 11). For example, GDI component 111 may expose and implement a 'DxgkDdiRenderKm' interface, along with corresponding hardware rendering operations. While GDI component 111 may implement any appropriate GDI operations, in some embodiments GDI component 111 implements the following operations:

```
typedef struct _DXGK_RENDERKM_COMMAND
{
  DXGK_RENDERKM_OPERATION Opcode;
  UINT CommandSize;
  union
  {
    DXGK_GDIARG_BITBLT           BitBlt;
    DXGK_GDIARG_COLORFILL        ColorFill;
    DXGK_GDIARG_ALPHABLEND       Alpha Bend;
    DXGK_GDIARG_STRETCHBLT       StretchBlt;
    DXGK_GDIARG_TRANSPARENTBLT   TransparentBlt;
    DXGK_GDIARG_CLEARTYPEBLEND   ClearTypeBlend;
  } Command;
} DXGK_RENDERKM_COMMAND;
```

Kernel-mode driver 109' is configured to send GDI commands and data 118 to render component 112' within root partition 103'. GDI commands and data 118 include information relating to 3D rendering devices and contexts for executing GDI acceleration commands. Render component 112' includes GDI component 114, which is configured to receive GDI commands and data 118 and to execute received GDI acceleration commands at physical GPU 101a'.

In particular, GDI component 114 is configured to create a GDI surface and a corresponding 3D rendering (or composition) device (e.g., a D3D device). The 3D rendering device is configured to provide appropriate context for executing GDI accelerated commands. The GDI surface can comprise any appropriate GDI surface, such as any of the following GDI surface types:

```
D3DKMDT_GDISURFACE_TEXTURE
D3DKMDT_GDISURFACE_STAGING_CPUVISIBLE
D3DKMDT_GDISURFACE_STAGING
D3DKMDT_GDISURFACE_LOOKUPTABLE
D3DKMDT_GDISURFACE_EXISTINGSYSMEM
3DKMDT_GDISURFACE_TEXTURE_CPUVISIBLE
```

GDI component 114 marks any created GDI surface as a sharable surface. This enables composition to a desktop to succeed.

Figure 2B:
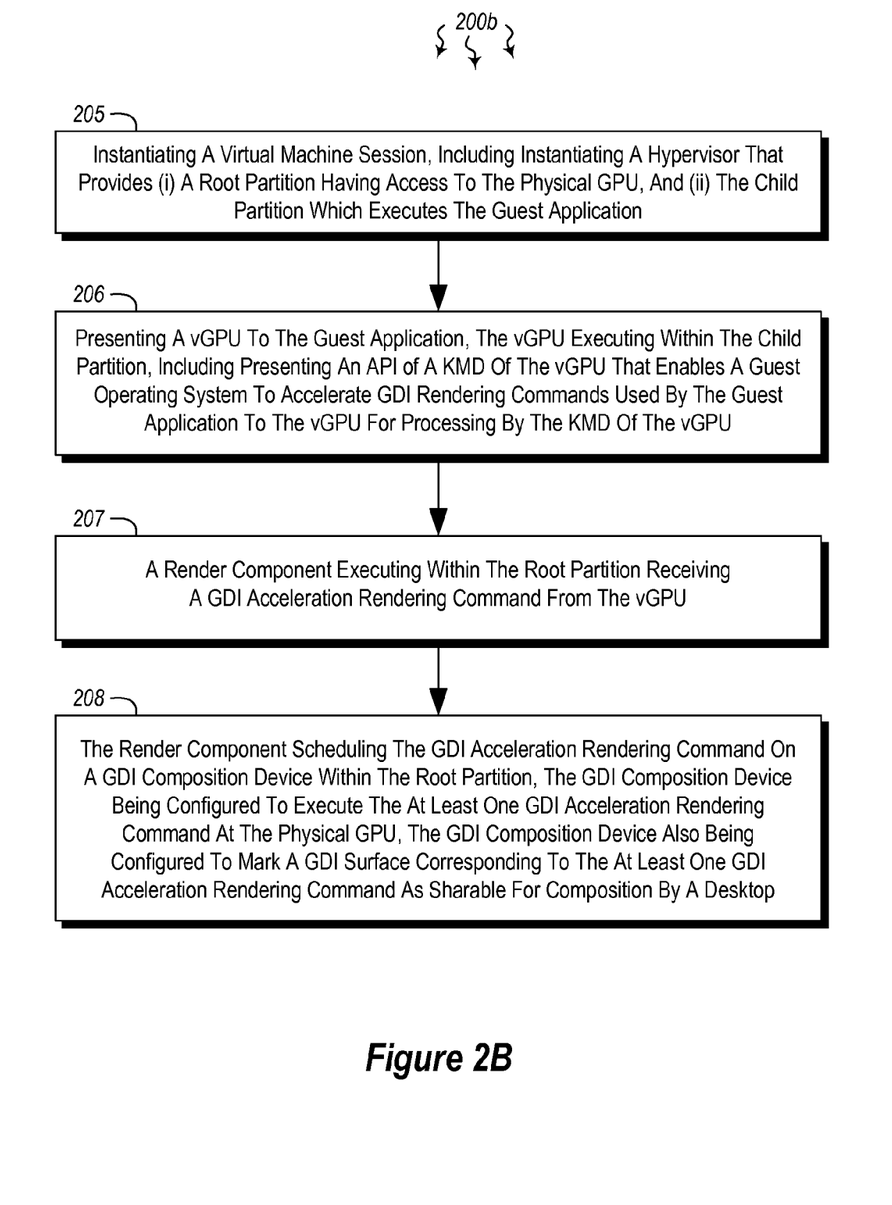
FIG. 2B illustrates a flow chart of an example method for providing GPU-accelerated GDI functionality to a guest application executing in a child partition of a para-virtualized execution environment.

FIG. 2B illustrates a flow chart of an example method 200b for providing GPU-accelerated GDI functionality to a guest application executing in a child partition of a para-virtualized execution environment. Method 200b will be described with respect to the components and data of computer architecture 100b.

Method 200b includes an act of instantiating a virtual machine session, including instantiating a hypervisor that provides (i) a root partition having access to the physical GPU, and (ii) the child partition which executes the guest application (act 205). For example, computing environment 100b can instantiate hypervisor 102' as part of instantiating a virtual machine session. Hypervisor 102' provides root partition 103' and child partition 104'. Root partition 103' has access to physical GPU 101a'. Child partition 104' executes one or more guest applications, including guest application 105', and has indirect access to physical GPU 101a'.

Method 200b also includes an act of presenting a vGPU to the guest application, the vGPU executing within the child partition, including presenting an API of a KMD of the vGPU that enables a guest operating system to accelerate GDI rendering commands used by the guest application to the vGPU for processing by the KMD of the vGPU (act 206). For example, child partition 104' presents vGPU 106' and GDI interface 108 to guest software 105'. GDI interface 108 enables graphics runtime 105a' (e.g., a graphics runtime of an operating system) to accelerate GDI rendering commands used by guest software 105' to vGPU 106' for processing by kernel-mode driver 109' and for acceleration by physical GPU 101a'. For example, graphics runtime 105a' can send graphics commands 120 to kernel-mode driver 109' through GDI interface 108 for performance of GDI acceleration commands. vGPU 106' uses GDI component 111 of kernel-mode driver 109' to process received GDI commands and to send GDI commands and data 118 to render component 112' in root partition 103'.

Method 200b also includes an act of a render component executing within the root partition receiving a GDI acceleration rendering command from the vGPU (act 207). For example, render component 112', which executes in root partition 103', can receive GDI commands and data 118 from vGPU 106'.

Method 200b also includes an act of the render component scheduling the GDI acceleration rendering command on a GDI composition device within the root partition, the GDI composition device being configured to execute the at least one GDI acceleration rendering command at the physical GPU, the GDI composition device also being configured to mark a GDI surface corresponding to the at least one GDI acceleration rendering command as sharable for composition by a desktop (act 208). For example, GDI component 114 can create a 3D rendering (composition) device and a GDI surface for execution of GDI acceleration commands and can schedule the GDI acceleration commands for execution on the 3D rendering (composition) device. The GDI surface can be marked as sharable for composition at the desktop.

Figure 1C:
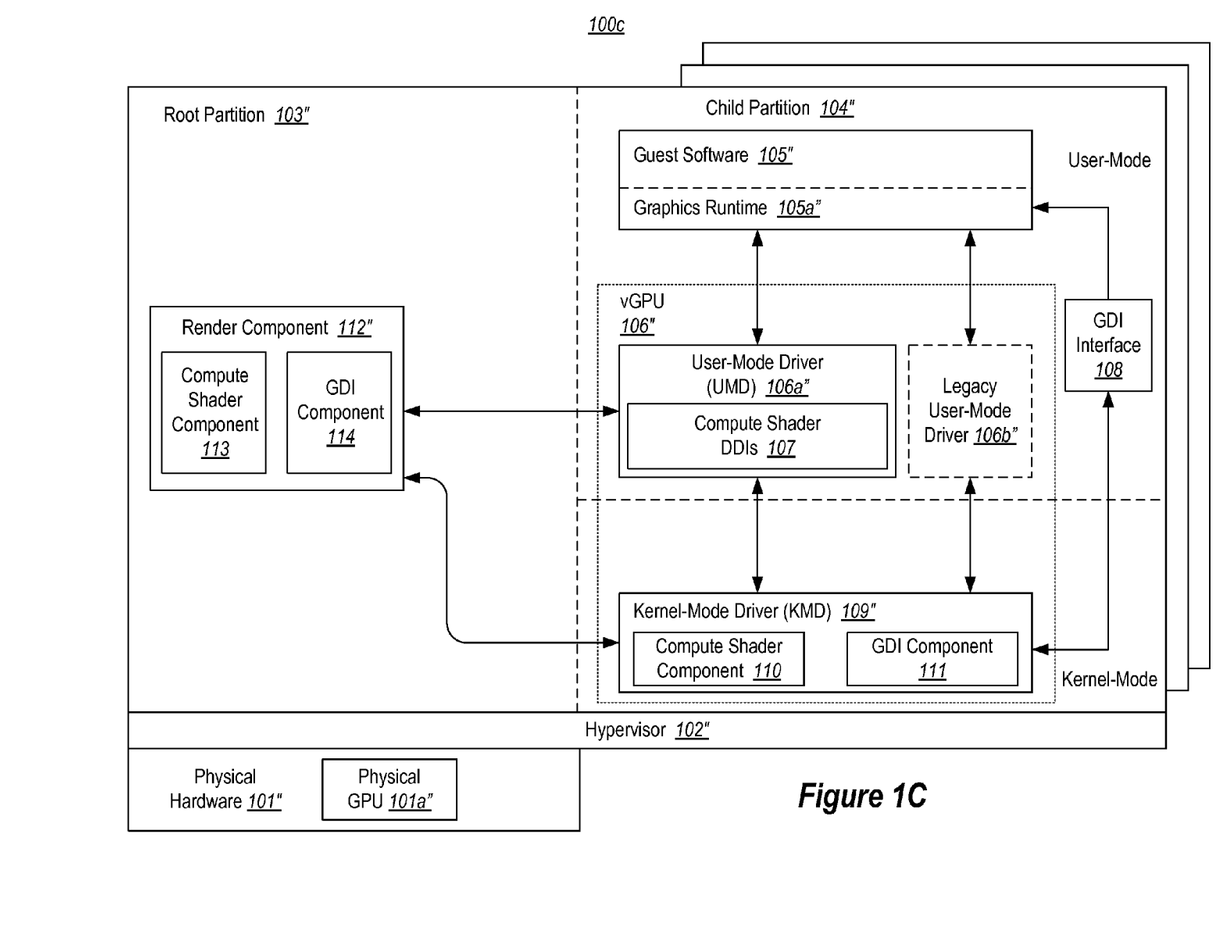
FIG. 1C illustrates an example computer architecture that enables para-virtualized access to compute shader functionality and para-virtualized GDI acceleration by physical GPU hardware.

Para-Virtualized Compute Shader (GPGPU) Functionality and Para-Virtualized GDI Acceleration In some embodiments, a single computer architecture can provide both compute shader (GPGPU) functionality and para-virtualized GDI acceleration. FIG. 1C illustrates an example computer architecture 100c that enables para-virtualized access to compute shader functionality and para-virtualized GDI acceleration by physical GPU hardware. For example, computer architecture 100c includes GDI interface 108 and vGPU 106". vGPU 106" contains user-mode driver 106a", which includes compute shader DDIs 107. vGPU 106" also contains kernel-mode driver 109" that includes both compute shader component 110a and GDI component 111.

vGPU 106" (executing in child partition 104"), can communicate both compute shader commands and data and GDI commands and data to render component 112" executing in root partition 103". Render component 112" includes both compute shader component 113 and GDI component 114 for executing compute shader and GDI commands at GPU 101a". It will be appreciated that computer architecture 100c, by including both compute shader and GDI functionality, can provide increased functionality and greater compatibility with particular rendering frameworks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a physical graphics processing unit ("GPU"), a method for providing GPU-accelerated computing functionality to a guest application executing in a child partition of a para-virtualized execution environment, the method comprising:

an act of instantiating a virtual machine session, including instantiating a hypervisor that provides (i) a root partition having access to the physical GPU, and (ii) the child partition which executes the guest operating system;

an act of presenting a graphics device interface ("GDI") interface to the guest operating system, the GDI interface executing within a user-mode of the child partition, the GDI interface exposing one or more GDI command interfaces to a graphics runtime associated with the guest operating and forwarding GDI accelerated commands from the graphics runtime to a kernel-mode driver ("KMD") of a virtualized graphics processing unit ("vGPU") executing within the child partition;

an act of presenting a vGPU to the guest operating system, including:

presenting an application programming interface of a user-mode driver ("UMD") that executes within the user-mode of the child partition and that presents a plurality of compute shader device driver interfaces ("DDIs") to the guest operating system, the plurality of compute shader DDIs enabling the guest operating system to send compute shader commands to the vGPU for performing general-purpose graphics processing unit ("GPGPU") computations at the physical GPU using a compute shader; and presenting an application programming interface of a kernel-mode driver ("KMD") that executes in a kernel mode of the child partition and that includes:

a GDI component that implements one or more GDI command interfaces for receiving one or more accelerated GDI operations from the GDI interface for execution on the physical GPU; and a compute shader component that receives a command buffer from the UMD and that constructs a corresponding direct memory access ("DMA") buffer;

an act of a render component executing within the root partition receiving a physical GPU-specific compute shader command and a GDI acceleration rendering command from the KMD of the vGPU;

an act of the render component scheduling the physical GPU-specific compute shader command for execution at the physical GPU; and an act of the render component scheduling the GDI acceleration rendering command on a GDI composition device within the root partition, the GDI composition device being configured to execute the GDI acceleration rendering command at the physical GPU.

2. The method as recited in claim 1, wherein the UMD converts any compute shader commands received from the guest application into corresponding physical GPU-specific compute shader commands and stores the corresponding physical GPU-specific compute shader commands in a command buffer.

3. The method as recited in claim 2, wherein the UMD sends the command buffer containing physical GPU-specific compute shader commands to the KMD.

4. The method as recited in claim 1, wherein support for GDI acceleration rendering commands by the KMD enables the creation of a compute shader composition device.

5. The method as recited in claim 1, wherein the render component uses a compute shader composition device within the root partition to execute the physical GPU-specific compute shader command.

6. The method as recited in claim 1, wherein the UMD comprises a new UMD that is enabled to execute concurrent with a legacy UMD.

7. A computer system, comprising:
one or more processors; and
one or more hardware storage devices having stored thereon computer-executable instructions that, when executed by the one or more processors, cause the computer system to provide GPU-accelerated computing functionality to a guest application executing in a child partition of a para-virtualized execution environment, including the following:

an act of instantiating a virtual machine session, including instantiating a hypervisor that provides (i) a root partition having access to the physical GPU, and (ii) the child partition which executes the guest operating system;

an act of presenting a graphics device interface ("GDI") interface to the guest operating system, the GDI interface executing within a user-mode of the child partition, the GDI interface exposing one or more GDI command interfaces to a graphics runtime associated with the guest operating and forwarding GDI accelerated commands from the graphics runtime to a kernel-mode driver ("KMD") of a virtualized graphics processing unit ("vGPU") executing within the child partition;

an act of presenting the vGPU to the guest operating system, including:

presenting an application programming interface of a user-mode driver ("UMD") that executes within the user-mode of the child partition and that presents a plurality of computer shader device driver interfaces ("DDIs") to the guest operating system, the plurality of compute shader DDIs enabling the guest operating system to send compute shader commands to the vGPU for performing general-purpose graphics processing unit ("GPGPU") computations at the physical GPU using a compute shader; and presenting an application programming interface of a kernel-mode driver ("KMD") that executes in a kernel mode of the child partition and that includes:

a GDI component that implements one or more GDI command interfaces for receiving one or more accelerated GDI operations from the GDI interface for execution on the physical GPU; and a compute shader component that receives a command buffer from the UMD and that constructs a corresponding direct memory access ("DMA") buffer;

an act of a render component executing within the root partition receiving a physical GPU-specific compute shader command and a GDI acceleration rendering command from the KMD vGPU;

an act of the render component scheduling the physical GPU-specific compute shader command for execution at the physical GPU; and an act of the render component scheduling the GDI acceleration rendering command on a GDI composition device within the root partition, the GDI composition device being configured to execute the GDI acceleration rendering command at the physical GPU, the GDI composition device also being configured to mark a GDI surface corresponding to the GDI acceleration rendering command as sharable for composition by a desktop.

8. The computer system as recited in claim 7, wherein the GDI acceleration rendering commands are usable as part of the compute shader at the physical GPU.

9. The computer system as recited in claim 7, wherein the UMD converts graphics commands received from the guest application into corresponding hardware-specific compute shader commands and stores the corresponding hardware-specific compute shader commands in the command buffer.

10. The computer system as recited in claim 7, wherein the vGPU comprises a software interface for providing access to the physical GPU.

11. The computer system as recited in claim 7, wherein the UMD comprises a new UMD that is enabled to present all DDIs corresponding to a rendering framework that includes a compute shader, including a rendering framework that also includes one or more of a domain shader, a hull shader, or a geometry shader.

12. A computer program product for use at a computer system, the computer program product for implementing a method for providing GPU-accelerated computing functionality to a guest operating system executing in a child partition of a para-virtualized execution environment, the computer program product comprising one or more hardware storage devices having stored thereon computer-executable instructions that, when executed at a processor, cause the computer system to perform the method, including the following:
  instantiate a virtual machine session, including instantiating a hypervisor that provides (i) a root partition having access to a physical GPU, and (ii) the child partition which executes the guest operating system;
  present a graphics device interface ("GDI") interface to the guest operating system, the GDI interface executing within a user-mode of the child partition, the GDI interface exposing one or more GDI command interfaces to a graphics runtime associated with the guest operating and forwarding GDI accelerated commands from the graphics runtime to a kernel-mode driver ("KMD") of a virtualized graphics processing unit ("vGPU") executing within the child partition;
  present the vGPU to the guest operating system, including:
    presenting an application programming interface of a user-mode driver ("UMD") that executes within the user-mode of the child partition and that presents a plurality of compute shader device driver interfaces ("DDIs") to the guest operating system, the plurality of compute shader DDIs enabling the guest operating system to send compute shader commands to the vGPU for performing general-purpose graphics processing unit ("GPGPU") computations at the physical GPU using a compute shader; and
    presenting an application programming interface of a kernel-mode driver ("KMD") that executes in a kernel mode of the child partition and that includes:
      a GDI component that implements one or more GDI command interfaces for receiving one or more accelerated GDI operations from the GDI interface for execution on the physical GPU; and
      a compute shader component that receives a command buffer from the UMD and that constructs a corresponding direct memory access ("DMA") buffer;
  receive, at a render component executing within the root partition, at least one physical GPU-specific compute shader command and at least one GDI acceleration rendering command from the KMD of the vGPU;
  schedule the at least one physical GPU-specific compute shader command for execution at the physical GPU; and
  schedule the at least one GDI acceleration rendering command on a GDI composition device within the root partition, the GDI composition device being configured to execute the GDI acceleration rendering command at the physical GPU, the GDI composition device also being configured to mark a GDI surface corresponding to the GDI acceleration rendering command as sharable for composition by a desktop.

* * * * *